US012169576B2

(12) United States Patent
LeVasseur et al.

(10) Patent No.: US 12,169,576 B2
(45) Date of Patent: Dec. 17, 2024

(54) AUTHENTICATION SERVICE FOR USE WITH INDENTITY PROVIDERS

(71) Applicant: Bread & Butter IO Inc., Vancouver (CA)

(72) Inventors: Thierry LeVasseur, Vancouver (CA); Esteban Astudillo, Vancouver (CA); Matt McLean, Vancouver (CA)

(73) Assignee: BREAD & BUTTER IO INC., Vancouver (CA)

( * ) Notice: Subject to any disclaimer, the term of this patent is extended or adjusted under 35 U.S.C. 154(b) by 330 days.

(21) Appl. No.: 17/655,774

(22) Filed: Mar. 21, 2022

(65) Prior Publication Data

US 2022/0300633 A1 Sep. 22, 2022

Related U.S. Application Data

(60) Provisional application No. 63/164,504, filed on Mar. 22, 2021.

(51) Int. Cl.
*G06F 21/62* (2013.01)
*G06F 21/31* (2013.01)
*G06F 21/60* (2013.01)

(52) U.S. Cl.
CPC .......... *G06F 21/6218* (2013.01); *G06F 21/31* (2013.01); *G06F 21/604* (2013.01); *G06F 2221/2115* (2013.01)

(58) Field of Classification Search
CPC .... G06F 21/6218; G06F 21/31; G06F 21/604; G06F 2221/2115

USPC ............................................................. 726/4
See application file for complete search history.

(56) References Cited

U.S. PATENT DOCUMENTS

| | | | | |
|---|---|---|---|---|
| 2003/0149781 | A1* | 8/2003 | Yared | H04L 63/0815 709/228 |
| 2005/0289341 | A1* | 12/2005 | Ritola | H04L 63/0815 713/168 |
| 2006/0236382 | A1* | 10/2006 | Hinton | G06F 21/41 726/8 |
| 2007/0186106 | A1* | 8/2007 | Ting | H04L 63/0815 713/168 |
| 2010/0011421 | A1* | 1/2010 | Chari | G06F 21/31 726/5 |
| 2011/0023099 | A1* | 1/2011 | Kim | G06F 21/33 726/5 |

(Continued)

*Primary Examiner* — Michael S McNally
(74) *Attorney, Agent, or Firm* — Alleman Hall & Tuttle LLP

(57) ABSTRACT

An authentication system for authenticating a user to access gated digital content includes a user computing device, a service provider server, an authentication service, and at least one identity provider. The service provider server is configured to require registration and authentication prior to providing the user with access to the gated digital content, and the at least one identity provider is configured to authenticate a user identity of the user. Upon receiving a request via the user computing device to access the gated digital content hosted by the service provider server, the authentication service displays an authentication platform interface to the user. The authentication platform interface displays at least one identity provider selector linked to the at least one identity provider, and the at least one identity provider is based on a policy of the authentication service set by the service provider.

18 Claims, 11 Drawing Sheets

(56) References Cited

U.S. PATENT DOCUMENTS

| | | | |
|---|---|---|---|
| 2011/0307938 A1* | 12/2011 | Reeves, Jr. | H04L 63/1483 726/3 |
| 2020/0153814 A1* | 5/2020 | Smolny | H04L 63/102 |
| 2021/0084020 A1* | 3/2021 | Larose | H04L 63/0807 |

* cited by examiner

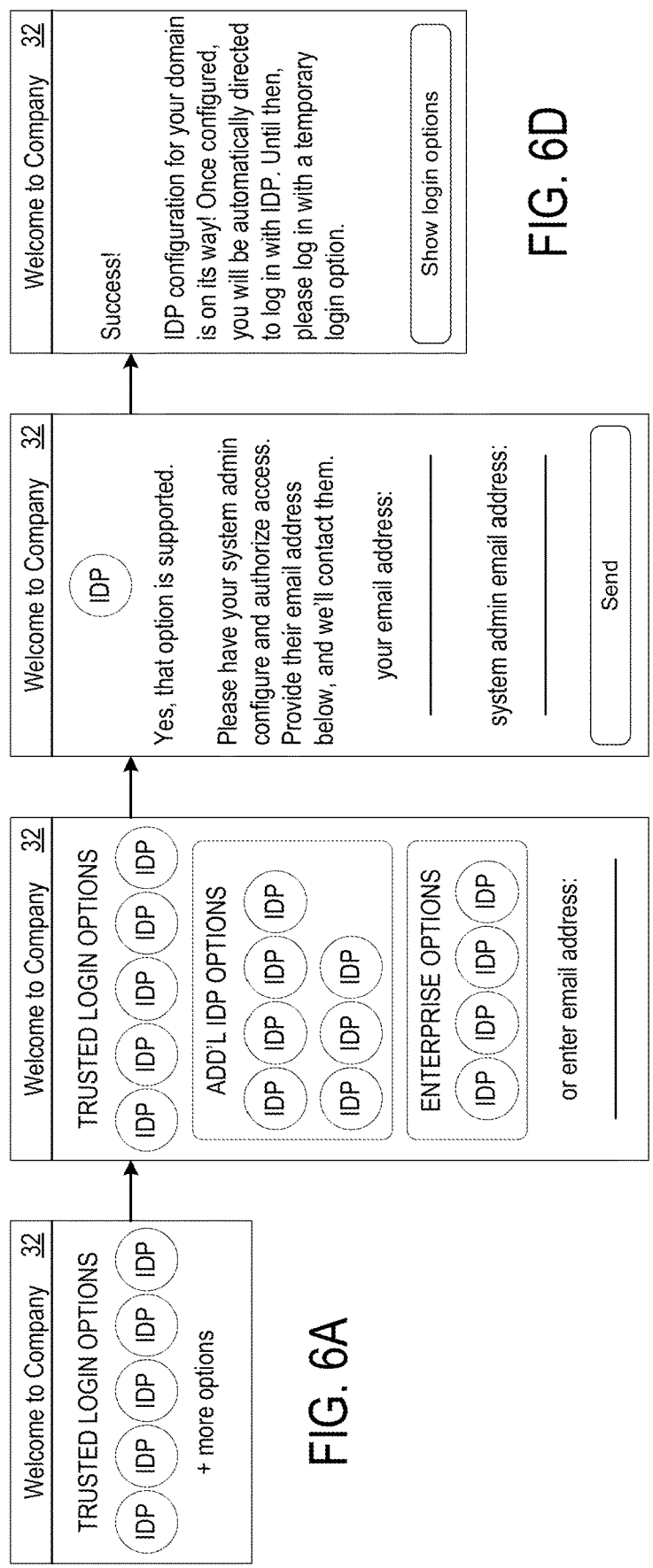

AUTHENTICATION SERVICE FOR USE WITH INDENTITY PROVIDERS

CROSS REFERENCE TO RELATED APPLICATION

The present application is based upon and claims priority under 35 U.S.C. 119(e) to U.S. Provisional Patent Application No. 63/164,504, filed Mar. 22, 2021, entitled AUTHENTICATION SERVICE FOR IDENTITY PROVIDER LIBRARY, the entirety of which is hereby incorporated herein by reference for all purposes.

BACKGROUND

Controlling user access to gated digital content on a website, system, network, or device via user registration and authentication increases security and prevents unauthorized users from accessing sensitive information. Additionally, user registration and authentication offer a convenient way for users to log on to previously visited websites, as well as allowing businesses to track user analytics and activity. Users often have the option of registering and authenticating through a third-party identity provider (IDP) that stores and manages users' digital identities. However, some third-party IDPs are opting to discontinue cookie usage, and/or don't allow access to personal data, thereby reducing the availability of third-party tracking and analytic data. For these reasons, service providers may desire to have more control over which IDPs a user selects, when the user is prompted to register, and if/how multi-factor authentication (MFA) is employed, for example. A challenge exists in designing a flexible authentication system that can be customized according to the needs of the service provider.

SUMMARY

To address the above issues, an authentication system is disclosed herein. The authentication system manages the implementation of IDPs on a service provider website and handles IDP updates, which permits the service provider to support a large number of login methods. The service provider can determine which IDPs are presented to users during the registration and authentication process, which allows users the freedom to choose a trusted IDP when registering with the service provider website. The service provider may also select an IDP that is best suited for their platform to be presented to users as a suggested IDP. MFA can be offered when logging in with IDPs, and the service provider can choose how the MFA is configured, such as short message service (SMS), device, one-time password (OTP), push notification, or even another IDP. Users are entered into the service provider database regardless of authentication method. Requiring users to log in with an IDP eliminates fake sign ups and incomplete forms from the service provider's analytics, thereby providing a clearer picture of user interaction with the website.

According to one aspect, an authentication system for authenticating a user to access gated digital content is provided. The authentication system includes a user computing device, a service provider, an authentication service, and at least one identity provider. The service provider may require registration and authentication prior to providing the user with access to gated digital content hosted by the service provider, and the identity provider is configured to authenticate the user's identity. When the service provider is integrated with the authentication service and receives a request at the user computing device to access the gated digital content, the request for authentication is redirected to the authentication service, which then displays an authentication platform interface to the user. The authentication platform interface displays at least one identity provider selector linked to at least one identity provider, as based on a policy of the authentication service set by the service provider.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A-6D show an example workflow of a user-initiated request to configure an IDP for a service provider integrated with the authentication service of FIG. 1.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1:
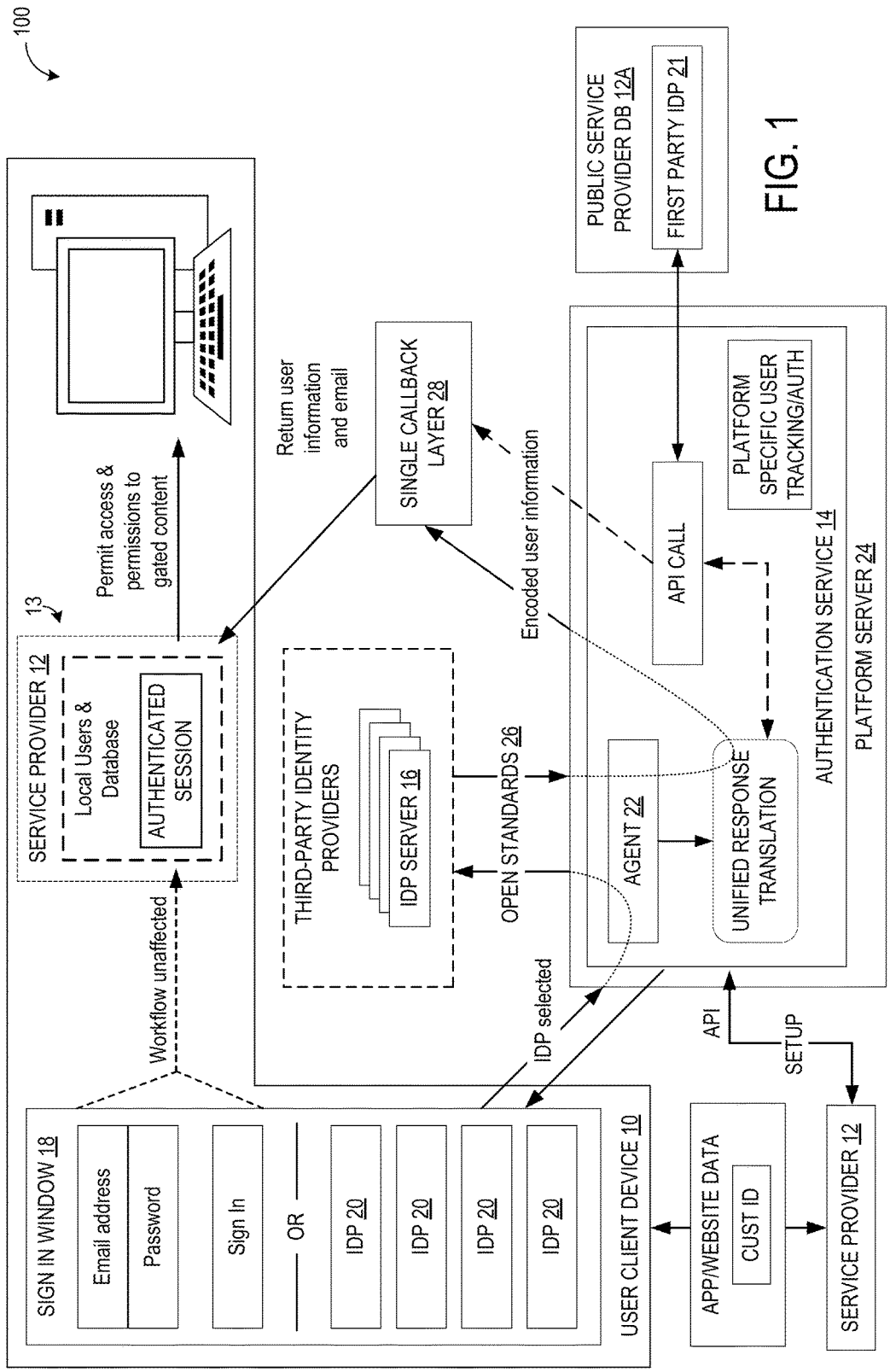
FIG. 1 shows a schematic diagram of an authentication system including an authentication service according to one embodiment of the present disclosure.

As schematically illustrated in FIG. 1, to address the above identified issues, an authentication system 100 is provided. The authentication system 100 includes a user client device 10 (referred to for simplicity as a user client 10), a service provider 12 service (referred to for simplicity as a service provider 12) executed on one or more service provider servers 13, an authentication service 14 executed on a platform server 24, and at least one IDP server 16, all of which may be configured to communicate with one another via a wide area network, such as the Internet. The user client 10 may, for example, take the form of a computing device such as a desktop computer, a smart phone device, a tablet computing device, a wrist mounted computing device, or any other suitable form of computing device that a user may use to access the Internet. The service provider 12 may be one of any number of companies or businesses that provide goods and services on the Internet via an application or website that requires users to register and authenticate via an IDP to achieve access to gated digital content. Examples of service providers include, but are not limited to, online retailers, banks, healthcare organizations, cloud-based software products, social media platforms, and the like. The gated digital content may include personalized product recommendations, savings offers or incentives, paywall/subscription-only articles, and the like, for example. Additionally, the gated digital content may be secure digital content, such as identifying information, financial records, or health data, for example. Each serviced provider 12 executes a service via a server application executed on one or more service provider servers 13.

The authentication service 14 manages a library of authentication methods for the service provider, such as third-party social IDPs and/or enterprise IDPs, to facilitate a login workflow for the service provider 12 for registering and authenticating a user using the user client 10. IDPs are typically cloud-hosted services that store and verify a user's identity, and they may be configured to work with single sign-on (SSO) providers to authenticate users.

As an intermediary between the service provider 12 and the library of IDPs, the authentication service 14 enables service providers 12 the ability to offer a variety of login options to their customers, while avoiding the hassle of managing multiple IDPs and without the need to acquire and store user passwords. As described in detail below, the authentication service is highly customizable to suit the needs of the service provider and can be modified and updated as desired by the service provider.

When a user sends a request to log in with the service provider 12 on the user client 10, a login graphical user interface (GUI) 18, depicted in FIG. 1 as a sign in window, typically appears on a display of the user client 10. The login GUI 18 may be populated with options for logging in, including email address and password fields, as well as one or more selectable IDP selectors 20. It will be appreciated that the IDP selectors 20 may be implemented as buttons that are graphical control elements and may be displayed as rectangular tiles, round icons, a drop-down menu, or any other suitable form that indicates a user-selectable element.

If the user is already registered with the service provider 12 and chooses to log in with their email address and password, the login request is typically authenticated via verification against registered user information stored in a database, and the user gains access to gated digital content. Alternatively, the user may log in by selecting one of the displayed IDP selectors 20 and providing identifying information that is authenticated via the IDP.

When the service provider 12 is integrated with the authentication service 14, the service provider 12 is enabled to determine which IDPs to support with their platform. Upon receiving a user request to log in, the service provider 12 provides links to the user client 10 so it can make a request to the authentication service 14, which returns data to populate the login GUI 18 with IDP selectors 20 curated according to the preferences of the service provider 12.

As shown schematically in FIG. 1 and described below with reference to FIG. 3, when a user requests to authenticate via an IDP, the request is sent from the user client 10 to the IDP server 16 associated with the selected IDP selector 20. The request hops through an agent 22 stored on a platform server 24 of the authentication service 14 to the IDP server 16. An open standard 26 may be used by the selected IDP to satisfy identity requirements for the user. Open standards allow IDPs to pass authorization credentials to service providers and include protocols such as OAuth 2, OpenID Connect (OIDC), or Security Assertion Markup Language (SAML), for example, and may vary depending on the IDP.

Upon successful authentication of the user's identity, the IDP server 16 sends an acknowledgement of the user credentials, including a unique identifier, to the authentication service 14 where the information is translated into a unified response. The unified response translation occurs at the platform server 24 of the authentication service 14 and ensures that user authentication can be relayed to the service provider 12, regardless of which IDP was selected. Encoded user information is transmitted via a single callback layer 28 according to a callback Uniform Resource Locator (URL) provided by the IDP server 20, which updates the local database and redirects the user back to the login GUI 18, and the user client 10 receives a token for an authenticated session with the service provider 12 and permission to access gated digital content. It will be appreciated that the single callback layer 28 refers to the fact that the service provider 12 can access the platform server 24 to negotiate user authentication through a plurality of third-party providers, via one callback layer implemented at the authentication service 14. Thus, the single callback layer 28, while drawn for purposes of illustration externally to the authentication service, is a callback layer implemented by the authentication service 14 itself.

A feature of the claimed authentication system 100 is that, unlike conventional authentication brokers, the authentication service 14 described herein does not store or manage information with regard to the user's digital identity, such as the user's usernames and/or passwords. Further, as described in detail below, the platform server 24 of the authentication service 14 may store platform-specific user tracking and authentication information to provide metrics of user behavior to the service provider 12, and to track user preferences for IDP options, etc.

Figure 2:
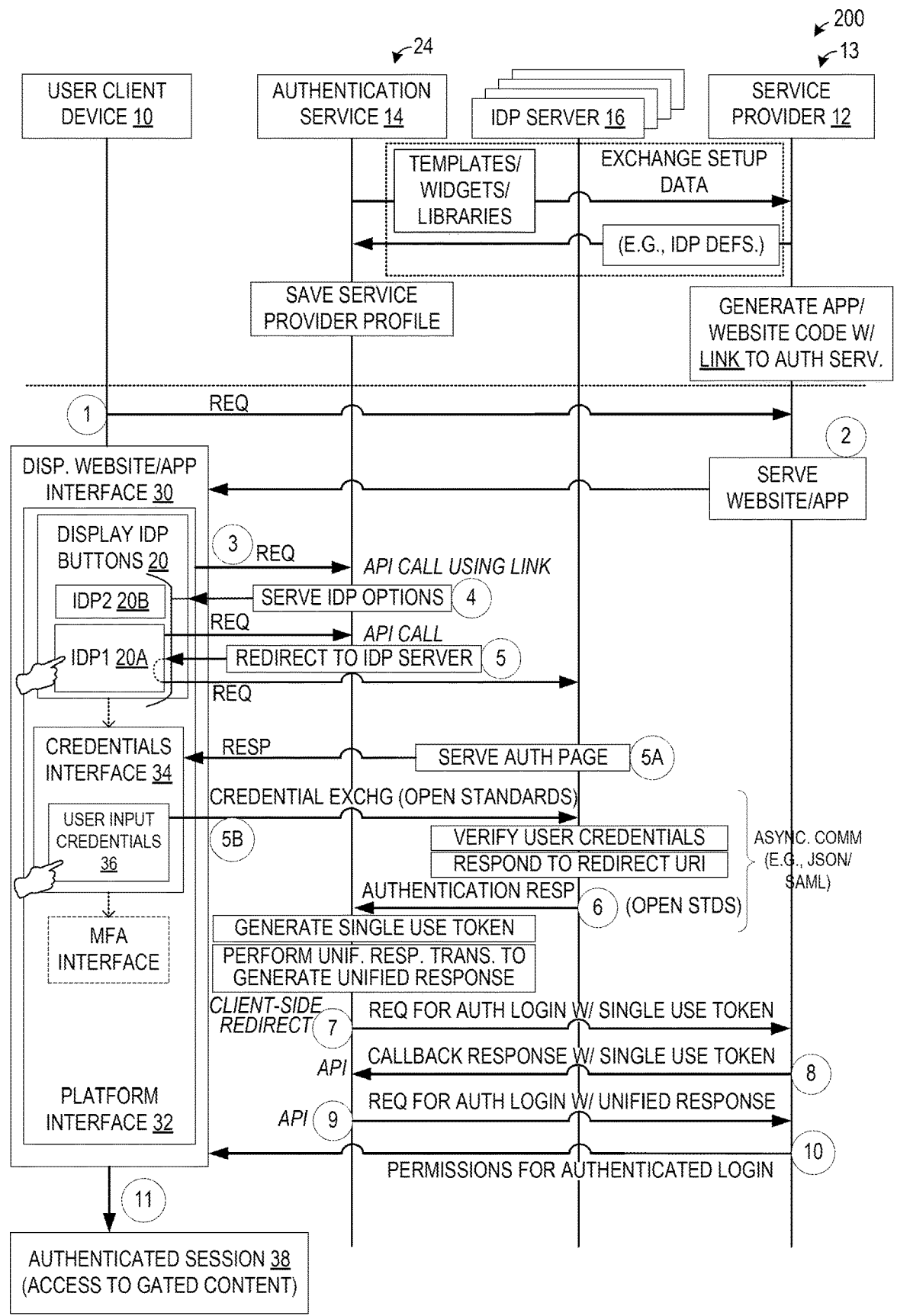
FIG. 2 shows a networking diagram showing the process of authenticating a user with the authentication service of FIG. 1.

FIG. 2 illustrates an example networking diagram for the process by which a user, such as a customer or employee, authenticates with the service provider 12 via the authentication service 14. As described above, the service provider 12 may host a website and/or application that requires a user to log in to gain access to gated digital content. For example, the service provider 12 may require employees who are registered with the service provider 12 to be authenticated prior to each active session. Additionally or alternatively, clients or customers of the service provider 12 may need to register and authenticate before being permitted to log in to the website or application hosted by the service provider 12. In some cases, a client or customer may register once to create a user profile, but they would still need to authenticate each time they visit the website or application. As described in detail below, the user may choose to have their profile deleted, or to be "de-identified," upon logging out, which would necessitate registering, in addition to authenticating, for a subsequent session with the service provider.

Prior to authenticating users via the authentication service 14, the service provider 12 must be integrated with the authentication service 14 via an exchange of setup data, as indicated by the dashed box in FIG. 2. Details of the process of configuring setup data and creating a service provider profile are described below with reference to the method shown in FIG. 3. In brief, the authentication service 14 may provide the service provider 12 with templates, widgets, and the like. A widget is a software program that may run as a stand-alone executable program or may run in a widget execution environment. In response, the service provider 12 defines to the authentication service 14 which IDPs will be displayed to the user as options for authentication. For ease of understanding, each step of the authentication process 200 illustrated in the networking diagram of FIG. 2 is numerically labeled.

Initially, the user of the user client 10 navigates to a website or application interface 30 of the service provider 12, and begins a login process on the login GUI 18, which sends a request for a string of code, such as JavaScript, or an application programming interface (API) to the service provider 12.

In response to the login request, the service provider 12 sends a link or address of the authentication service platform server 24 to the user client 10, which is displayed as an authentication platform interface 32 on the service provider's website or application interface 30. The authentication platform interface 32, which may be implemented as a widget configured during the integration of the service provider 12 with the authentication service 14, is presented to the user to launch the authentication process, thereby sending a login request from the user client 10 to the authentication service 14. The authentication service 14 response serves the IDP options, which populates the authentication platform interface 32 with IDP selectors 20 curated by service provider 12. In the example illustrated in FIG. 2, two IDP selectors 20A, 20B represent two different IDPs that the service provider 12 has selected to be displayed. However, it will be appreciated that the authentication platform interface 32 may be configured to display one or several IDP selectors 20, according to the setup data.

Upon selection of the IDP selector 20 that represents the desired IDP, as indicated in FIG. 2 with a hand icon selecting IDP1 20A, the user client 10 sends an API call to the authentication service 14 to request to authenticate with the selected IDP. The request is subsequently redirected from the authentication service 14 to the selected IDP server 16. The redirect URL may be preconfigured during the exchange of setup data when the service provider 12 integrates with the authentication service 14 and included in the payload when the service provider 12 sends the link or address of the authentication service platform server 24 to the user client 10. Additionally or alternatively, the URL may be added to a redirect URL whitelist maintained at the authentication service 14 and sent from the authentication service 14 to the user client 10 in response to the API call.

The IDP server 16 then serves an authentication page to the user client 10, directing the user to enter their credentials via a credentials interface 34. This request hops through the authentication service 14. The user then enters user input credentials 36 in the credentials interface 34 at the user client 10, which are subsequently delivered to the IDP server 16. In some implementations, the IDP may be configured to require multi-factor authentication (MFA) independently of the service provider 12 and the authentication service 14. With this configuration, the user may complete the MFA requirements prior to returning response to the IDP server 16. To preserve sensitive digital identity information, the credentials are available to the credentials interface 34 of the user client 10, but not to the authentication service platform server 24.

An authentication response, i.e., success/failure message, is generated when the open standard 26 authenticates the user input credentials 36 sent to the IDP server 16. The IDP server 16 then returns an acknowledgement of the input user credentials and the authentication response to the authentication service platform server 24. Upon receiving the authentication response, the authentication service 14 creates a single use authentication token and performs a unified response translation to generate a unified response.

The request for an authenticated login and the single use authentication token are then redirected to the service provider 12 via a callback URL. It will be appreciated that this callback URL may be set up in the exchange of setup data between the service provider 12 and the authentication service 14, and stored on the platform server 24 of the authentication service 14. The single use authentication token is subsequently used by the service provider 12 to confirm their identity based on information exchanged with the authentication service 14 during the initial setup, which further ensures that the encoded user information is transmitted to the correct service provider 12 with proven credentials.

The service provider 12 responds with an authenticated API call including the single use authentication token to the authentication service 14, which returns the request for an authenticated login and the unified response including encoded user information to the service provider 12. The service provider 12 sends permissions for an authenticated login to the user client 10, which is finally redirected to the final desired destination by service provider 12 and may include an authenticated session 38 to provide access to the gated digital content.

It will be appreciated that a proxy server may be configured for use between the redirection from the IDP server 16 to the authentication service 14 to maintain the display of the service provider's domain at the user client 10 such that the authentication service 14 is invisible throughout the authentication process 200. This configuration provides a seamless authentication experience for the user while permitting the service provider 12 to delegate the authentication process to the authentication service 14.

Figure 3:
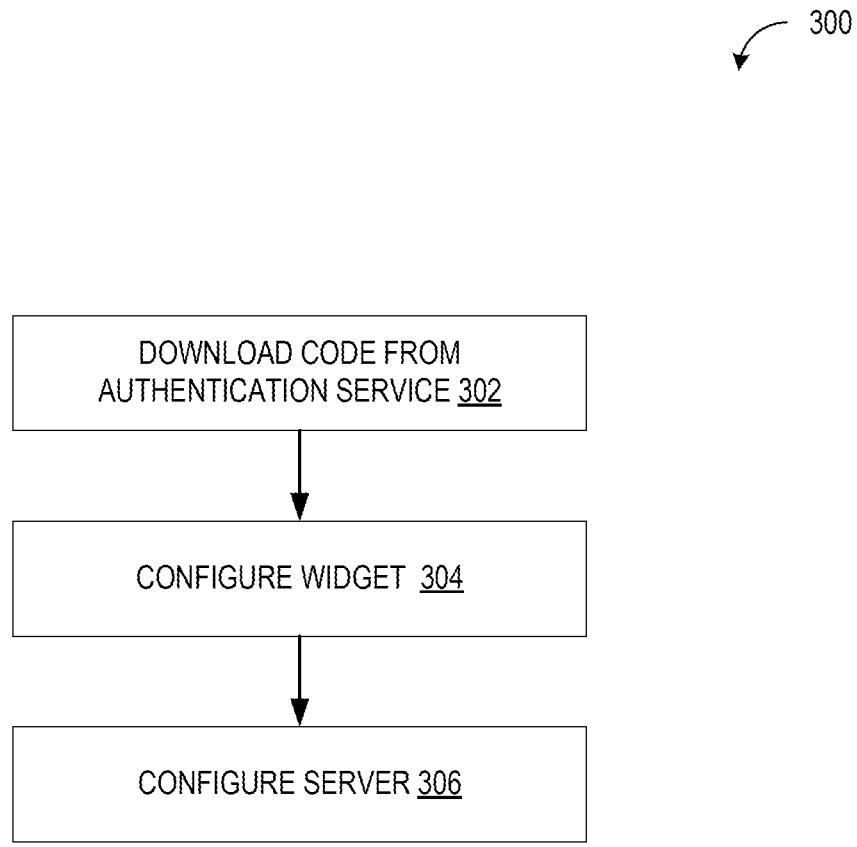
FIG. 3 shows a flowchart for a method for integrating a service provider with the authentication service of FIG. 1.

FIG. 3 shows an example flowchart for a method 300 for integrating the service provider 12 with the authentication service 14. Policies and rules for how the authentication service 14 is implemented on the service provider's platform are configured during the initial set up and integration. However, it will be appreciated they can be changed at any time after the service provider 12 is integrated with the authentication service 14.

At step 302, the method 300 includes downloading code from the authentication service. The authentication service 14 includes pre-written code that can be downloaded and installed to integrate the website and/or application hosted by the service provider 12 with the authentication service 14. The code may be in the form of a JavaScript library (JSL), but it may alternatively be in any suitable format or coding language. The JSL provides all the design elements and renders authentication options directly in the existing page of the service provider 12, thereby allowing the service provider to integrate the authentication service 14 with a simple front end script tag and minimal configuration.

Continuing to step 304 from step 302, the method 300 includes configuring a widget to display on the service provider's page that permits authentication via the authentication service 14. The widget may appear anchored as an overlay, and it provides the user with a simple method to identify themselves with the service provider 12 without having to navigate away from their active page.

Proceeding to step 306 from step 304, the method 300 includes configuring the service provider server 13 associated with the service provider 12. Some implementation details are required in order to retrieve the details of the users that are authenticating so that they can be onboarded into the service provider's workflows. As described in Table 1 below, an APP_ID is required to authenticate the implementation of the service provider 12 with the authentication service 14, and a CALLBACK_URL that points to a location in the service provider's system for managing authentications must be configured.

authentication request, the authentication service 14 uses conventional HTTP response codes.

Figure 4:
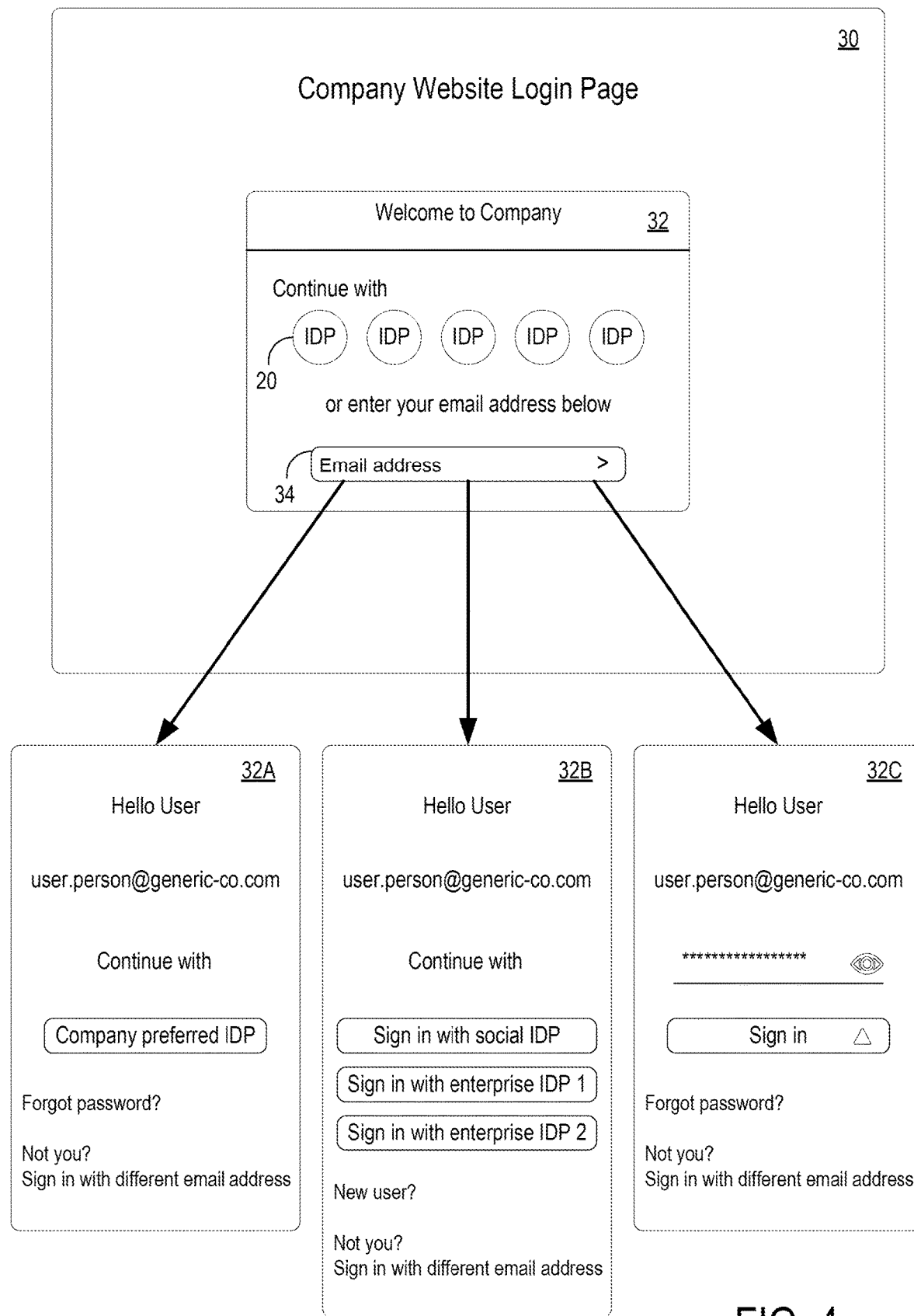
FIG. 4 shows example authentication platform interfaces for authenticating a user with a service provider integrated with the authentication service of FIG. 1.

FIG. 4 shows example authentication platform interfaces 32 for authenticating a user with a service provider 12 integrated with the authentication service 14. As described above, the authentication platform interface 32 is displayed within the service provider's website/application interface 30 by the authentication service 14. The configuration of the authentication platform interface 32 may depend on factors such as the history of the user with the service provider 12 and the policies set in place when the service provider 12 integrated with the authentication service 14.

Three examples of the authentication platform interface 32 are illustrated in FIG. 4. If the user is an established customer or employee of the service provider 12, upon entering their email address, they may be presented with an

TABLE 1

Configuration details

| Parameter | Description |
|---|---|
| app_id | [STRING] Unique identifier for the service provider's application. |
| callback_url | [STRING] The Callback URL is the URL that the user will be redirected to after they have authenticated with the service provider. |
| destination_url | [STRING] The Destination URL is the final destination for the user to be redirected. |
| app_name | [STRING] This parameter is the application name that the service provider chooses to display in the widgets. |
| client_data | [OBJECT] Client data is used to allow the service provider to pass parameters from the client side to the backend, which processes the authentication. |
| force_reauthentication | [STRING] [off/attempt/force] Forces reauthentication when the user logs in (i.e., disregards the user's current session if the provider supports it). |
| page_view_tracking | [BOOLEAN] [DEFAULT: true] By default, events for all a user's page views will be created. This parameter allows the service provider to disable this feature. |
| selector_theme | [STRING] This parameter allows the service provider to change the theme of the provider selectors displayed in the widgets. |
| expand_email_address | [BOOLEAN] [DEFAULT: true] This parameter is used to expand the email address field on advanced discovery. |
| show_login_focus | [BOOLEAN] [DEFAULT: true] Show the background blur for the "continue with" login command on the advanced discovery. |
| continue_with_position | [OBJECT] [Example: {'top': '10px', 'right': '10px'}] Used for positioning the "continue with" widget. Will accept only one parameter for top/bottom and one parameter for left/right. Accepts 10, '10px', and '10%' for positioning. |

Once the service provider server 13 of the service provider 12 is configured, the authentication service 14 may be used as a broker for IDPs to authenticate users logging in with the service provider 12.

After redirecting the user to the desired IDP during the authentication process, the Callback URL is used to transfer control from the authentication service 14 back to the service provider 12. Once a user has authenticated with an IDP, the authentication service 14 will invoke the service provider's Callback URL with an 'app_id' and 'token' as query string parameters. During integration of the authentication service 14, the service provider 12 implements code that retrieves the 'authentication_token' from the query string and then sends a request to 'GetAuthentication' to determine if the login attempt was a success. After processing the results of 'GetAuthentication', the typical user authentication workflow can resume, such as creating the user's session, creating cookies, redirecting to a default page, and the like. To indicate the success or failure of a user authentication platform interface 32A that displays an IDP selector 20 for the service provider's preferred IDP. Additionally or alternatively, the user may be presented with an authentication platform interface 32B that provides the user with the options of continuing the authentication process with one of several IDPs. The IDPs may be social IDPs, enterprise IDPs, or a combination thereof. Examples of social IDPs may include predefined types such as Microsoft, Google, LinkedIn, Facebook, Twitter, and the like. Enterprise IDPs are typically used in a corporate enterprise setting for identity and access management (IAM) or in personal computing to authenticate users prior to giving them permission to access gated content, such as online activities that take place behind a registration wall, including online shopping and access to subscription-based content. Azure, Okta, SharePoint, and Salesforce are examples of enterprise IDPs.

If the service provider 12 includes an existing local user database, registered users may simply enter their password in the credentials interface 34 within the authentication platform interface 32C to log in with the service provider 12, as described above with reference to FIG. 1. Additionally, the service provider 12 may configure the authentication service 14 to include an MFA step that is independent of IDP authentication. Because some IDPs do not require MFA and/or it may not be possible to know if an IDP used MFA to authenticate the user, this step provides an additional layer of security and ensures that the user is authenticated via MFA.

Regardless of the configuration of the authentication platform interface 32, options for signing in with a different email address will typically be offered in case the current user is not associated with an email address that has been saved to the user client 10 and/or registered with the service provider 12.

In some implementations, the service provider 12 may set policies for the authentication service 14 to offer a suggested IDP selector 20 in the authentication platform interface 32 in response to the user's request to log in with an email address. The suggested IDP may be determined by the service provider 12. If there is no suggested login platform available for the user's email and/or domain context, default IDPs in accordance with the service provider's policies set during integration with the authentication service 14 will be displayed in the authentication platform interface 32.

The service provider 12 may additionally configure the authentication service 14 to present authentication options in accordance with one or more spatiotemporal access requirements. For example, the service provider 12 may set rules that prohibit the display of IDP selectors 20 based on a geographic location, time of day, timeframe, device, device type, or the like. When a user visits the service provider's website or application, a spatiotemporal characteristic of the user client 10 may be determined. If the spatiotemporal characteristic of the user client 10 meets the spatiotemporal access requirements, then the authentication platform interface 32 is displayed on the user client 10. However, if the user client 10 is determined to be in a location, at a time, or a device or device type that is outside of the spatiotemporal access requirements set by the service provider 12, the user may be unable to authenticate because the authentication service 14 will refrain from presenting an authentication platform interface 32 with login options. This configuration may be beneficial if a company desires to limit access to local users, or if an employer does not want their employees to have access to gated content outside of work hours, for example.

In some implementations, if no domain policies are set by the service provider 12, the suggested IDP may be based on the user's email address context and/or domain context. The authentication service 14 may be configured to test parameters to produce a score that points to a predictive suggested IDP.

In the context of using artificial intelligence and machine learning to predict which IDP selector 20 should be displayed to the user, the authentication service 14 may be configured to use heuristics to make a prediction for the suggested IDP selector 20 for the user. These heuristics may be fed as parameter values into a convolutional neural network (CNN), which then records and processes the user's actual selected IDP selectors as training data for feedback training. Example parameters that may be considered as heuristics include the user's IP address, the website accessed, time of day, day of week, search parameters, referring URL, etc. This data may be parameterized and fed into a CNN as described above. Additionally, artificial intelligence may be similarly implemented to predict a preferred email address for a user when authenticating with a certain service provider 12. For example, if a particular user uses a first email address for business websites and a second email address for shopping and personal email websites, an artificial intelligence model may be trained that predicts for a current website, whether the user will use the first or second email address. In training the model, the content of the websites may be classified using sentiment classifiers that are trained to recognize "personal use" websites and "business use" websites based on semantic analysis of text included on such websites.

In some implementations, when a user logs in with a specific IDP, the authentication service 14 may be configured to set a cookie associated with the user's identity such that only the selected IDP selector 20 is presented to that user during subsequent logins with the same user client 10. Additionally or alternatively, the authentication service 14 can be configured to display IDP selectors 20 based on the user's history with all service providers integrated with the authentication service 14. For example, if the user selects a different IDP to log in with one or more different service providers that are also integrated with the authentication service 14, all of the IDP selectors 20 associated with previously selected IDP servers 16 may be displayed for the user in subsequent login processes with a service provider integrated with the authentication service 14.

Figure 5A:
FIGS. 5A and 5B show an example authentication platform interface for authenticating an existing user registered with a service provider integrated with the authentication service of FIG. 1.

FIG. 5A shows an example authentication platform interface 32 for authenticating an existing user registered with a service provider 12 prior to integration with the authentication service 14. When an existing user that has previously been authenticated with the service provider 12 initiates a login process for an authenticated session 38 after the service provider integrates with the authentication service 14, they do not need to re-register with the service provider 12. The authentication service 14 is configured to support authentication with email addresses and local password combinations. As such, even when a service provider 12 delegates their entire registration and authentication workflow to the authentication service 14, they do not need to migrate their user database. Upon initiation of an authentication request by an existing user, an authentication platform interface 32D displaying an email address and password combination as the authentication method will be displayed to the existing user, as illustrated in FIG. 5A.

Figure 5B:

FIG. 5B shows an example authentication platform interface 32 for authenticating existing or new users with a service provider 12 integrated with the authentication service 14. In addition or as an alternative to logging in with an email address and local password, the authentication service 14 may be configured to offer existing users the option to authenticate with an IDP by displaying an authentication platform interface 32E, as shown in FIG. 5B. The same authentication platform interface 32E may be displayed to new users as well. The authentication service 14 may be configured to channel all users authenticating with the service provider 12 into the same workflow, regardless of whether they log in with a local password or an IDP.

Further, the user may use different IDPs to authenticate with the same service provider 12 without causing the creation of a separate user account in the service provider database. For example, a user may authenticate with one IDP for an authenticated session with the service provider 12 and create a user account with the service provider 12 during that session. The user may then authenticate with a different IDP for a second authenticated session with the service provider 12, and the service provider 12 may be configured to recognize the user and refrain from creating a second user account, regardless of the use of the different IDP. As such, the authentication service 14 enables the service provider 12 to offer authentication across multiple IDPs, thereby allowing the user to authenticate with a desired IDP and/or without the need to remember which IDP they previously used for authenticating with the service provider 12.

In some implementations, a user may desire to log in to a service provider 12 with an IDP that is supported by the authentication service 14, but is not configured as an authentication method according to the rules and policies set by the service provider 12. As such, the user may send a request to the service provider 12 to configure an IDP, as illustrated by the example workflow of a user-initiated request to configure an IDP illustrated in FIGS. 6A-6D.

Upon navigating to a website or application interface 30 of the service provider 12, the user may be presented with an authentication platform interface 32 displaying IDP selectors 20 for IDPs that the service provider 12 has configured with the authentication service 14 as trusted login options for authenticating requests to access gated content, as shown in FIG. 6A. If the user desires to authenticate with an IDP not included in the trusted options presented in the authentication platform interface 32, they can select "more options" to display IDP selectors associated with additional IDPs supported by the authentication service 14.

As shown in FIG. 6B, the additional IDP options may include social IDPs and enterprise IDPs. Because every enterprise IDP is unique to each service provider, the displayed enterprise IDP selectors are not active to log in. However, the user may select a desired enterprise IDP selector to initiate a workflow to request access to configuring and authorizing the enterprise IDP as a login option for the service provider 12.

In order to configure the enterprise IDP as a login option for the service provider 12, the user will be directed to enter the email address for the service provider's system administrator to configure the enterprise IDP as a login option, as shown in FIG. 6C. In the case that the service provider 12 is not integrated with the authentication service 14, this workflow may alternatively be used as a request to create an account with the authentication service 14.

When the email address for the service provider's system administrator is received at the authentication service 14, a success message is displayed in the authentication platform interface 32, as illustrated in FIG. 6D. Because authorization is required by the service provider 12 before configuring the enterprise IDP as a login option, the user will be directed to temporarily log in with one of the service provider's trusted login options.

In any of the implementations described herein in which a user is required to accept terms and conditions prior to beginning an authenticated session 38 with a service provider 12, a user may request that their information be removed from a service provider 12 upon conclusion of the authenticated session 38. As such, the authentication service 14 may be configured to de-identify a user in response to a formal request by the user to be de-identified, i.e., a "forget me" request. De-identification of the user results in removal of the username, email address, and session number, as well as any and all personal history and preferences associated with the user. However, the unique ID that is assigned to the user to track and record data of the user's visit to the service provider's website or application, but is not associated with any identifying information, and any activities linked to the unique ID are not deleted such that the service provider 12 may retain the metrics of the authenticated session 38 regardless of the user's identity. Upon removal of any identifying information associated with the user during their authenticated session 38, the user receives confirmation that they were de-identified with the service provider 12. If the user returns to the website or application interface 30 of the service provider 12, they will not be remembered as a registered user.

Figure 7:
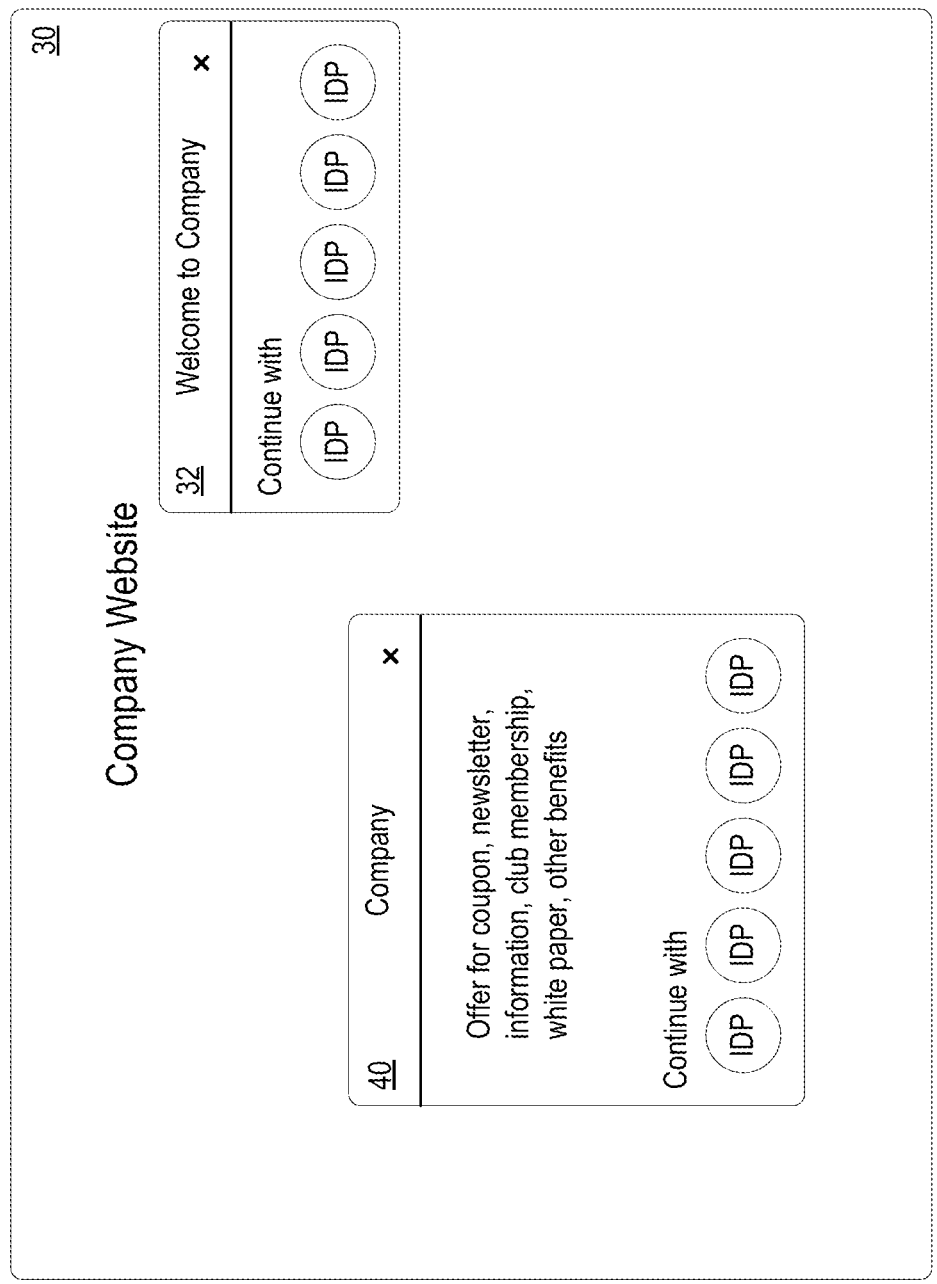
FIG. 7 shows an example incentive widget of a service provider integrated with the authentication service of FIG. 1.

In some use-case scenarios, the authentication service 14 may be implemented in an e-commerce environment to give a service provider 12, such as an online retailer, more control over user management without being directly involved in user password management or authentication. Additionally, the service provider 12 may utilize the authentication service 14 to assist in identifying users that visit their website or application earlier on in the user experience, regardless of whether they make a purchase. As such, the authentication service 14 may be configured to display an incentive widget 40 to a user in the service provider's website or application interface, as illustrated in FIG. 7.

As shown, the registration and authentication interface for a service provider 12 can be linked to features that a user encounters during their visit, such as a download request, coupon offer, newsletter sign-up, or the like, to prompt them to register. This feature simplifies registration for the user and permits the service provider 12 to understand who is visiting their site, even if the user does not make a purchase.

Figure 8:
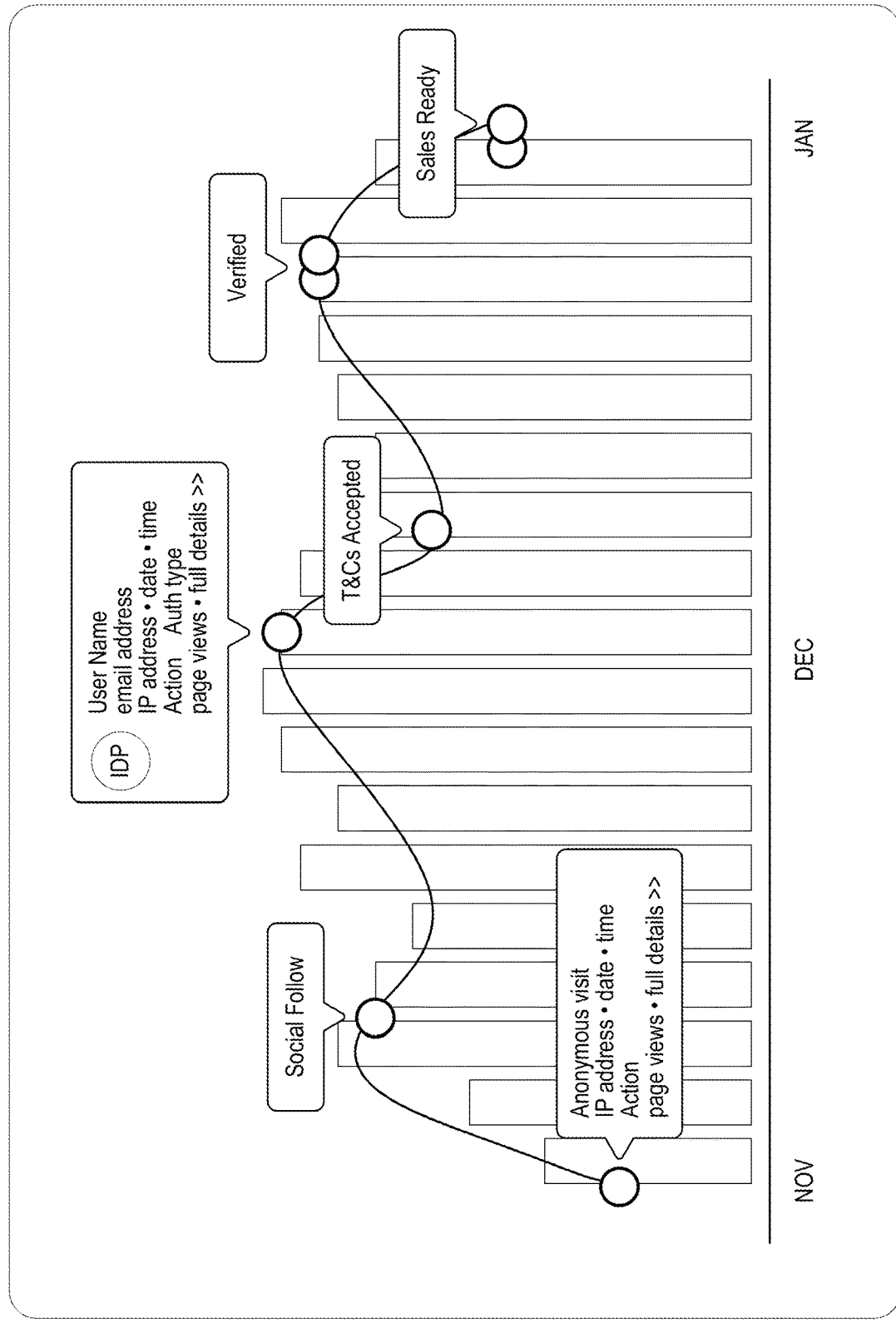
FIG. 8 shows an example dashboard for viewing a progressive user journey with a service provider integrated with the authentication service of FIG. 1.

The authentication service 14 may also be implemented by a service provider 12 to track a user's visits to their website or application, prior to and after registration with the service provider 12. An example dashboard 42 for viewing a progressive user journey with a service provider 12 is shown in FIG. 8.

When a user first visits the website or application of a service provider integrated with the authentication service, they are assigned a device ID. Using the device ID, a user's activities during visits to the service provider's website or application can be tracked and recorded by type and date. These activities may include authentication events, conversion events, page views, and any custom events defined by the website or application, as well future events associated with the service provider's website or application, such as MFA and reading emails, for example. In the example illustrated in FIG. 8, the service provider 12 can view a user's activity over time, from their first anonymous visit, to a social follow event, to becoming an identified user. When a user registers with the service provider 12 in response to a displayed incentive widget 40, as shown in FIG. 7, that information can be recorded with the user profile. Once a user is registered, the authentication service enables the service provider to associate a first set of activities of the previously anonymous user with a second set of activities of the identified user via the device ID, thereby associating all activities of the user with a same user account of the identified user. The service provider 12 can additionally track information such as when the user accepts the terms and conditions for the service provider's website or application, as well as when their identity is verified. Verification of the user's identity can be achieved by going through the SSO process via an IDP, confirming their email address via a workflow, or the like.

Figure 9:
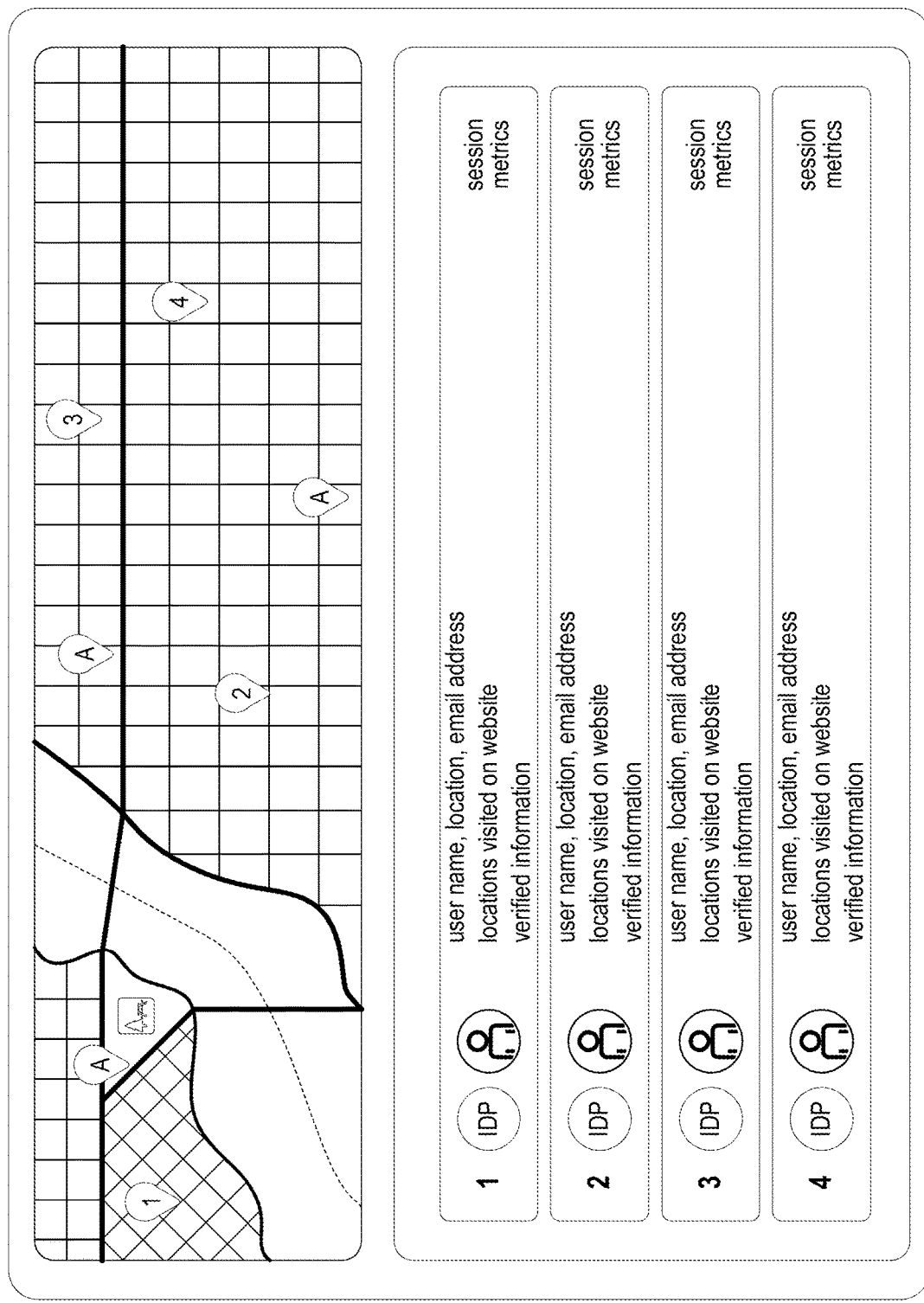
FIG. 9 shows an example dashboard for tracking user activity with a service provider integrated with the authentication service of FIG. 1.

The authentication service 14 may be further configured to display users' tracked activities in a single, unified view, such as a user tracking dashboard 44, as illustrated in FIG. 9. The user tracking dashboard 44 enables the service provider 12 to track the locations and activities of identified users and monitor in real time who is logged in and through which IDP option. Additional information, such as the incentive widget 40 to which the user responded may also be included. Custom events can be created to track data that is meaningful to the service provider 12. Tracking the navigation of users during visits to the service provider's website or application provides a record of customer interests, time spent on features, and other analytics of the user journey, which can be used to adjust content, improve the user experience, and curate user lists for targeted content.

Figure 10:
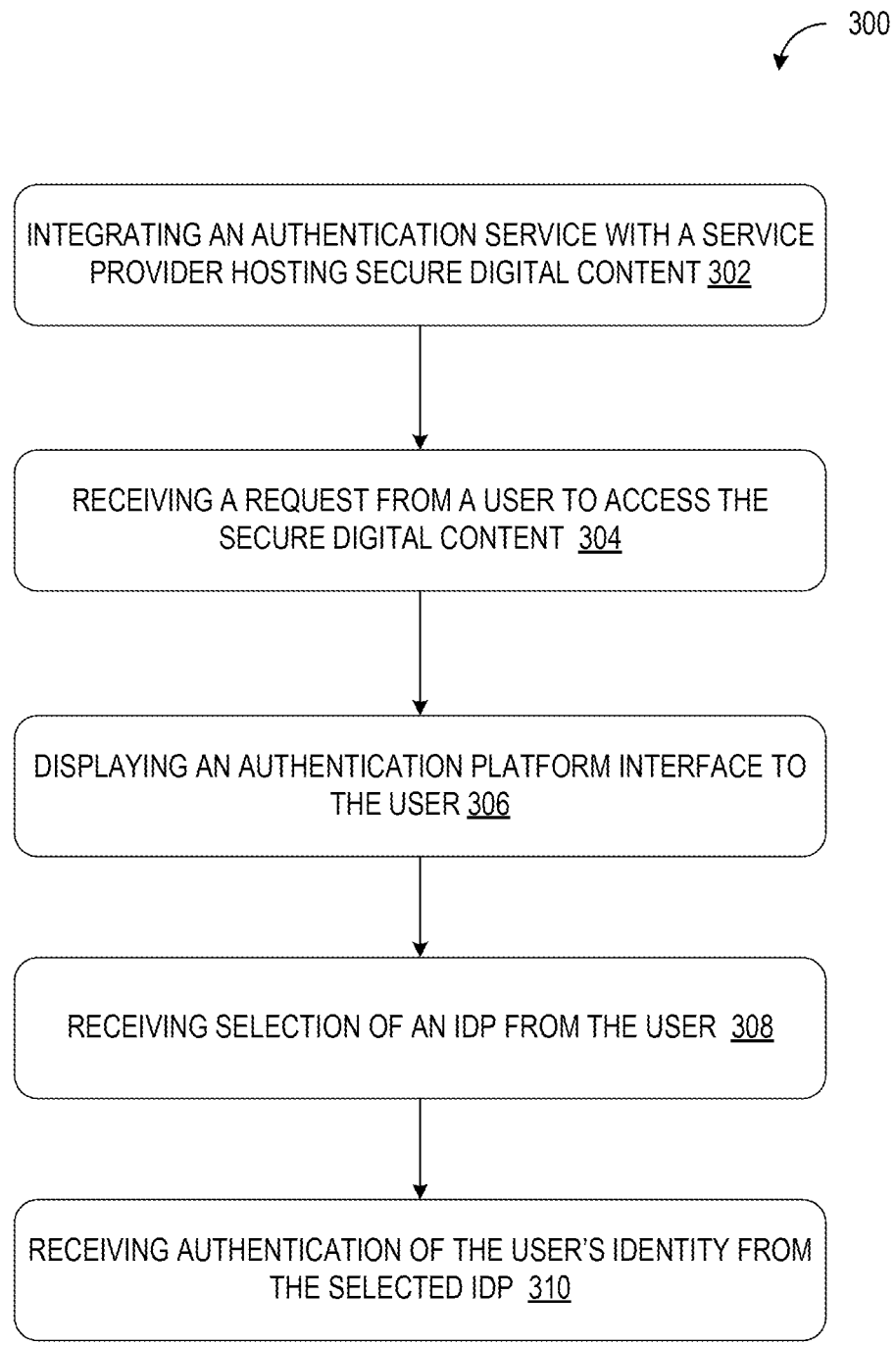
FIG. 10 is a flowchart of a method for authenticating a user to access gated digital content according to one example configuration of the present disclosure.

FIG. 10 is a flowchart of a method 300 for authenticating a user to access gated digital content. At step 302, the method 300 may include integrating an authentication service with a service provider hosting gated digital content. As described above with reference to FIG. 3, the service provider may download and install code from the authentication service. A widget may be configured for display on the service provider's page. Additionally, the server associated with the service provider may be configured for use with the authentication service.

Continuing from step 302 to step 304, the method 300 may include receiving a request from a user to access the gated digital content. When the service provider is integrated with the authentication service and receives a request from a user to access the gated digital content, the request for authentication is redirected to the authentication service.

Proceeding from step 304 to step 306, the method 300 may include displaying an authentication platform interface to the user. The authentication platform interface may be implemented as a widget configured during the integration of the service provider with the authentication service. It is presented to the user to launch the authentication process, thereby sending a login request from the user client to the authentication service. The authentication service response serves the IDP options, which populates the authentication platform interface with IDP selectors curated by service provider. The IDPs may be social IDPs, enterprise IDPs, or a combination thereof.

Advancing from step 306 to step 308, the method 300 may include receiving selection of an IDP from the user. The user may opt to log in with a preferred IDP to gain access to the gated digital information during an authenticated session with the service provider. Additionally, the user may use different IDPs to authenticate with the same service provider without causing the creation of a separate user account in the service provider database. As such, the authentication service enables the service provider to offer authentication across multiple IDPs, thereby allowing the user to authenticate with a desired IDP and/or without the need to remember which IDP they previously used for authenticating with the service provider.

Continuing from step 308 to step 310, the method 300 may include receiving authentication of the user's identity from the selected IDP. As described above, an authentication response, i.e., success/failure message, is generated when the open standard authenticates the user input credentials sent to the IDP server. The IDP server then returns an acknowledgement of the input user credentials and the authentication response to the authentication service platform server.

The method 300 may further comprise determining the service provider is a first service provider, and selecting the at least one identity provider selector displayed to the user based on a history of the user with one or more service providers different from the first service provider, the one or more service providers being integrated with the authentication service. The method 300 may further comprise, upon authentication of the user identity, receiving, by the authentication service, an acknowledgement of user credentials, including a unique identifier, from the identity provider, and translating the acknowledgment into a unified response that can communicate the user authentication to the service provider regardless of the selected identity provider. The method 300 may further comprise, in response to a request from the user, removing, by the authentication service, identifying information of the user from the service provider server at a conclusion of an authenticated session with the service provider. The method 300 may further comprise determining the at least one identity provider is a first identity provider, and changing the policy of the authentication service set by the service provider to include a second identity provider different from the first identity provider in response to a user request.

When the at least one identity provider selector is one of a plurality of identity provider selectors, each of the plurality of identity provider selectors being linked to a different identity provider, the method 300 may further comprise displaying the plurality of identity provider selectors in the authentication platform interface. The method 300 may further comprise determining a spatiotemporal characteristic of the user client device and identifying a spatiotemporal access requirement for the authentication platform interface. If the spatiotemporal characteristic of the user client device meets the spatiotemporal access requirement, the method 300 may comprise displaying the authentication platform interface. The spatiotemporal characteristic of the user client device does not meet the spatiotemporal access requirement, the method 300 may comprise refraining from displaying the authentication platform interface.

The method 300 may further comprise configuring the at least one identity provider to be an enterprise identity provider associated with the service provider in response to a user request. When the at least one identity provider is a first identity provider, the method 300 may further comprise, in response to a user request, authenticating the user with the first identity provider for a first authenticated session with the service provider, the first authenticated session including creation of a user account with the service provider, in response to a user request, authenticating the user with a second identity provider different from the first identity provider for a second authenticated session with the service provider, and refraining from creating a second user account with the service provider based on authentication with the second identity provider. When the user is an anonymous user during a first authenticated session with the service provider, the method 300 may further comprise registering the anonymous user with the service provider in a subsequent authenticated session, in response to a user request by the anonymous user to become an identified user, and configuring the authentication service to associate a first set of activities of the previously anonymous user prior to registration as the identified user with a second set of activities of the identified user after registration, so that both the first set and the second set of activities are associated with a same user account of the identified user.

The systems and methods for the authentication system described herein may be used to implement an authentication service on service provider websites and applications. The authentication service manages a library of IDP login options for users of the service provider, which can be presented throughout the user experience on the website or application, thereby achieving the beneficial effects of converting anonymous visitors to registered and authenticated users sooner. With the authentication service, service providers can easily track and manage user activity and metrics, support complex enterprise workflows, and provide their users with a curated list of login options to enhance the convenience and security of both the service provider and the user.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
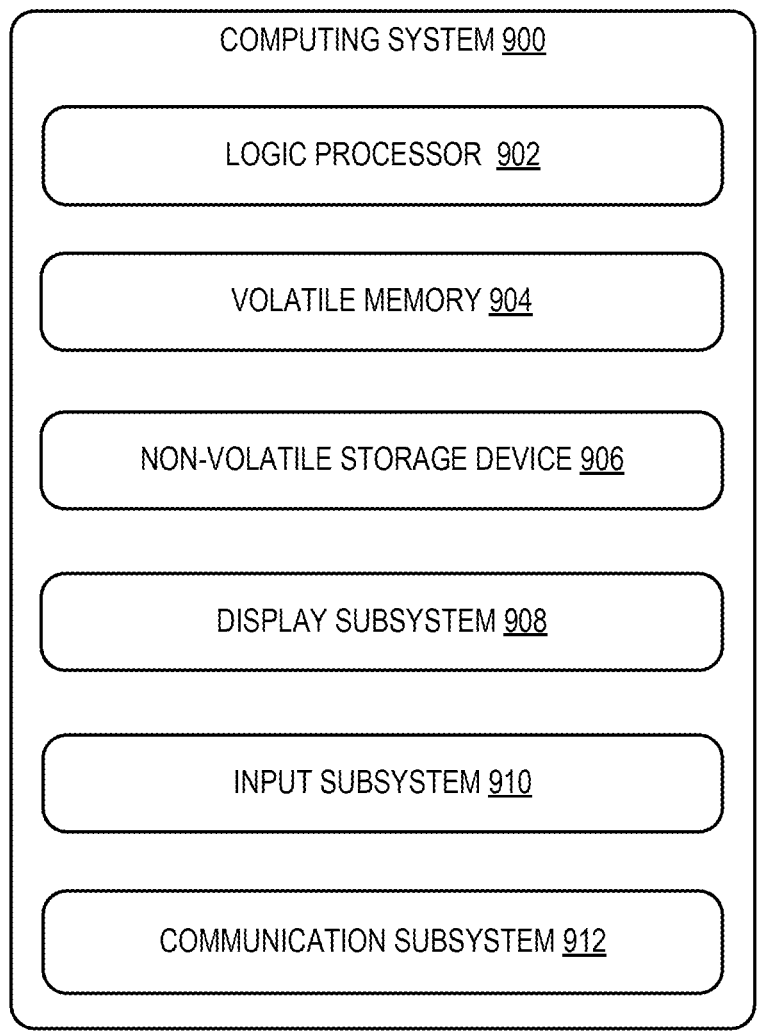
FIG. 11 shows an example computing system according to one implementation of the present disclosure.

FIG. 11 schematically shows a non-limiting embodiment of a computing system 900 that can enact one or more of the methods and processes described above. Computing system 900 is shown in simplified form. Computing system 900 may embody the user client 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An authentication system for authenticating a user to access gated digital content, the authentication system comprising:
   a user computing device including a processor, memory, and a display;
   a service provider server configured to require registration and authentication prior to providing the user of the user computing device with access to the gated digital content;
   an authentication server executing an authentication service; and
   at least one identity provider (IDP) service executed on an IDP server configured to authenticate a user identity of the user, wherein
   responsive to receiving a request via the user computing device to access the gated digital content hosted by the service provider server, the authentication service displays an authentication platform interface to the user via the user computing device,
   the authentication platform interface displays at least one identity provider selector linked to the at least one identity provider service, the at least one identity provider service being determined based on a policy of the authentication service set by the service provider,
   the at least one identity provider is a first identity provider, and
   the user initiates a request to change the policy of the authentication service set by the service provider to include a second identity provider different from the first identity provider.

2. The authentication system according to claim 1, wherein
   the service provider is a first service provider, and
   the at least one identity provider selector displayed to the user is selected based on a history of the user with one or more service providers different from the first service provider, the one or more service providers being integrated with the authentication service.

3. The authentication system according to claim 1, wherein
   upon authentication of the user identity, the authentication service receives an acknowledgement of user credentials, including a unique identifier, from the IDP server, and
   the authentication server translates the acknowledgement into a unified response that communicates the user authentication to the service provider server regardless of the selected identity provider.

4. The authentication system according to claim 1, wherein
   in response to a request from a user, the authentication service removes identifying information of the user from the service provider server at the conclusion of an authenticated session with the service provider.

5. The authentication system according to claim 1, wherein
   the at least one identity provider selector is one of a plurality of identity provider selectors displayed in the authentication platform interface, each of the plurality of identity provider selectors being linked to a different identity provider.

6. The authentication system according to claim 1, wherein
   a spatiotemporal characteristic of the user client device is determined by the authentication service,
   a spatiotemporal access requirement for the authentication platform interface is identified, and
   the authentication service displays the authentication platform interface when the spatiotemporal characteristic of the user client device meets the spatiotemporal access requirement, and refrains from displaying the authentication platform interface with the spatiotemporal characteristic of the user client device does not meet the spatiotemporal access requirement.

7. The authentication system according to claim 1, wherein
   the user initiates a request to configure the first identity provider or the second identity provider to be an enterprise identity provider unique to the service provider.

8. The authentication system according to claim 1, wherein
   the user authenticates with the first identity provider for a first authenticated session with the service provider, the first authenticated session including creation of a user account with the service provider,
   the user authenticates with the second identity provider for a second authenticated session with the service provider, and
   the service provider refrains from creating a second user account for the user based on authentication with the second identity provider.

9. The authentication system according to claim 1, wherein
   the user is an anonymous user during a first authenticated session with the service provider,
   in a subsequent authenticated session, the anonymous user registers with the service provider to become an identified user, and
   the authentication service enables the service provider to associate a first set of activities of the previously anonymous user prior to registration as the identified user with a second set of activities of the identified user after registration, so that both the first set and the second set of activities are associated with a same user account of the identified user.

10. A method for authenticating a user to access gated digital content, the method comprising:
configuring a server of a service provider to interoperate with an authentication service, the server of the service provider hosting gated digital content;
receiving a request from a user to access the gated digital content hosted by the service provider;
responsive to receiving the request from the user to access the gated digital content hosted by the service provider, displaying an authentication platform interface to the user, the authentication platform interface being configured to display a first identity provider selector linked to a first identity provider, the first identity provider being based on a policy of the authentication service set by the service provider during integration;
changing the policy of the authentication service set by the service provider to include a second identity provider different from the first identity provider in response to a user request, the second identity provider being linked to a second identity provider selector displayed in the authentication platform interface;
receiving a selection of the first identity provider or the second identity provider from the user; and
receiving authentication of the user identity from the selected identity provider.

11. The method according to claim 10, the method further comprising:
determining the service provider is a first service provider; and
selecting the first provider selector displayed to the user based on a history of the user with one or more service providers different from the first service provider, the one or more service providers being integrated with the authentication service.

12. The method according to claim 10, the method further comprising:
upon authentication of the user identity, receiving, by the authentication service, an acknowledgement of user credentials, including a unique identifier, from the identity provider; and
translating the acknowledgment into a unified response that can communicate the user authentication to the service provider regardless of the selected identity provider.

13. The method according to claim 10, the method further comprising:
in response to a request from the user, removing, by the authentication service, identifying information of the user from the service provider server at a conclusion of an authenticated session with the service provider.

14. The method according to claim 10, wherein the first identity provider selector and the second identity provider selector are two of a plurality of identity provider selectors, each of the plurality of identity provider selectors being linked to a different identity provider, the method further comprising:
displaying the plurality of identity provider selectors in the authentication platform interface.

15. The method according to claim 10, the method further comprising:
determining a spatiotemporal characteristic of the user client device;
identifying a spatiotemporal access requirement for the authentication platform interface; and
if the spatiotemporal characteristic of the user client device meets the spatiotemporal access requirement, then displaying the authentication platform interface, else refrain from displaying the authentication platform interface.

16. The method according to claim 10, the method further comprising:
configuring the first identity provider or the second identity provider to be an enterprise identity provider associated with the service provider in response to a user request.

17. The method according to claim 10, the method further comprising:
in response to a user request, authenticating the user with the first identity provider for a first authenticated session with the service provider, the first authenticated session including creation of a user account with the service provider;
in response to a user request, authenticating the user with the second identity provider for a second authenticated session with the service provider; and
refraining from creating a second user account with the service provider based on authentication with the second identity provider.

18. The method according to claim 10, wherein the user is an anonymous user during a first authenticated session with the service provider, the method further comprising:
registering the anonymous user with the service provider in a subsequent authenticated session, in response to a user request by the anonymous user to become an identified user; and
configuring the authentication service to associate a first set of activities of the previously anonymous user prior to registration as the identified user with a second set of activities of the identified user after registration, so that both the first set and the second set of activities are associated with a same user account of the identified user.

* * * * *

UNITED STATES PATENT AND TRADEMARK OFFICE
CERTIFICATE OF CORRECTION

| | | |
|---|---|---|
| PATENT NO. | : 12,169,576 B2 | Page 1 of 1 |
| APPLICATION NO. | : 17/655774 | |
| DATED | : December 17, 2024 | |
| INVENTOR(S) | : Thierry LeVasseur, Esteban Astudillo and Matt McLean | |

It is certified that error appears in the above-identified patent and that said Letters Patent is hereby corrected as shown below:

On the Title Page

Item (54) and in the Specification Column 1, Line 2, delete "INDENTITY" and insert --IDENTITY--.

Signed and Sealed this
Second Day of September, 2025

Coke Morgan Stewart
*Acting Director of the United States Patent and Trademark Office*